(12) United States Patent
Kurihara et al.

(10) Patent No.: US 7,114,513 B2
(45) Date of Patent: Oct. 3, 2006

(54) OVER-FUELING PREVENTION VALVE

(75) Inventors: Kazumasa Kurihara, Fujisawa (JP); Yasutomo Kobayashi, Yamato (JP)

(73) Assignee: NIFCO Inc., Yokohama (JP)

( * ) Notice: Subject to any disclaimer, the term of this patent is extended or adjusted under 35 U.S.C. 154(b) by 0 days.

(21) Appl. No.: 11/190,900

(22) Filed: Jul. 28, 2005

(65) Prior Publication Data

US 2005/0257831 A1    Nov. 24, 2005

Related U.S. Application Data

(62) Division of application No. 10/370,586, filed on Feb. 24, 2003, now Pat. No. 6,959,720.

(30) Foreign Application Priority Data

Apr. 5, 2002    (JP) .............................. 2002-104279

(51) Int. Cl.
*F16K 24/04* (2006.01)
(52) U.S. Cl. ......................................... 137/202; 137/43
(58) Field of Classification Search ................ 137/202, 137/43
See application file for complete search history.

(56) References Cited

U.S. PATENT DOCUMENTS

| | | | | |
|---|---|---|---|---|
| 5,960,817 A | * | 10/1999 | Johansen et al. | ............ 137/202 |
| 6,311,675 B1 | * | 11/2001 | Crary et al. | .................. 137/43 |
| 6,959,720 B1 | * | 11/2005 | Kurihara et al. | ............ 137/202 |

* cited by examiner

*Primary Examiner*—Kevin Lee
(74) *Attorney, Agent, or Firm*—Manabu Kanesaka

(57) ABSTRACT

A fuel valve includes an upper chamber communicating with a ventilation passage of a canister; a lower chamber to be disposed inside a fuel tank; a communicating port between the upper chamber and the lower chamber; and a float member disposed in the lower chamber for blocking the communicating port when fuel flows into the lower chamber. A bottom orifice or a one-way valve is formed in the bottom of the lower chamber for preventing the fuel to flow into the lower chamber and allowing the fuel to flow out from the bottom of the lower chamber. A fuel inlet is formed at a lower side of the side wall to face upwardly to allow the fuel to gradually enter the lower chamber so that an inner pressure in the fuel tank increases by entering the fuel into the lower chamber after the fuel reaches the fuel inlet.

5 Claims, 14 Drawing Sheets

OVER-FUELING PREVENTION VALVE

CROSS-REFERENCE TO RELATED APPLICATION

This is a Divisional Application of patent application Ser. No. 10/370,586 filed on Feb. 24, 2003 now U.S. Pat. No. 6,959,720.

BACKGROUND OF THE INVENTION AND RELATED ART STATEMENT

The present invention relates to a fuel valve for preventing over-fueling. In the fuel valve, when a fuel level inside a fuel tank reaches a predetermined level upon fueling, a ventilation path of a canister is blocked or partially blocked. As a result, an internal pressure of the fuel tank increases to raise a fuel level inside a fuel tube, so that a sensor at a fueling nozzle can detect the fuel tank is filled.

A conventional fuel valve includes a skirt support portion with an opening lower end disposed inside a fuel tank for covering around a connection portion between the fuel tank and a ventilation path of a canister. When a fluid level inside the fuel tank reaches the opening lower end of the skirt support portion, an internal pressure of the fuel tank increases. As a result, a fuel level inside a fuel tube rises so that a sensor at a fueling nozzle side can detect fill-up, thereby preventing over-fueling. (For example, as disclosed in Japanese Patent Publication (KOKAI) No. 10-500088)

However, since the fuel is quickly poured into the fuel tank through the fueling nozzle, the fuel surface inside the fuel tank sways or waves, resulting in being unstable. Therefore, in the skirt support portion described above, it is possible that the waving fuel surface touches the opening lower end of the skirt support portion. In that case, even if the tank is not filled-up yet, it is possible that the sensor at the fueling nozzle detects the fill-up.

Also, due to the rapid fueling, a large quantity of a gas inside the fuel tank passes through the ventilation path during the fueling. Thus, when the skirt support portion is used to detect the fill-up, the gas passing through the ventilation portion carries a part of the fuel into the canister side before the fuel level reaches the opening lower end of the skirt support portion, thereby damaging the canister.

An object of the present invention is to provide a fuel valve in which the sensor at the fueling nozzle can detect the fill-up accurately when the fuel tank is filled-up.

Another object of the invention is to provide a fuel valve in which a part of the fuel is prevented from entering the ventilation passage of the canister.

Further objects and advantages of the invention will be apparent from the following description of the invention.

SUMMARY OF THE INVENTION

In order to achieve the above-mentioned objects, in the first aspect of the present invention, a fuel valve includes an upper chamber communicating with a ventilation passage of a canister; a lower chamber to be disposed inside a fuel tank; a communicating port connecting between the upper chamber and the lower chamber; a float member stored in the lower chamber for blocking the communicating port from the lower chamber side when fuel flows into the lower chamber. The lower chamber includes a one-way valve formed at a bottom thereof for allowing the fuel to flow out only through the one-way valve, and a main fuel inlet formed in a side surface of the lower chamber. When a fuel level inside the fuel tank reaches the main fuel inlet, the fuel flows into the lower chamber. Then, the float member blocks the communicating port to increase an internal pressure of the fuel tank, so that a sensor at a fueling nozzle side can detect that the fuel tank is filled-up.

According to the above-mentioned configuration, only when the fuel level inside the fuel tank reaches the main fuel inlet formed in the side surface of the lower chamber, the fuel enters the lower chamber to increase the internal pressure of the fuel tank. Therefore, it is possible to prevent such a case that the fuel enters the lower chamber before the fuel tank is filled-up because the fuel inside the fuel tank waves during fueling. If this happens, the ventilation passage of the canister is blocked or partially blocked to increase the internal pressure of the fuel tank. As a result, the fuel level in the fuel tube rises, and the sensor of the fueling nozzle side detects the fill-up.

In addition, because the main fuel inlet is formed in the side surface of the lower chamber, it is possible to prevent a part of the fuel from entering the upper chamber through the communicating port before the floating member blocks the communicating port, thereby preventing the fuel from entering the ventilation passage of the canister.

When the fuel tank is filled-up, the floating member eventually blocks the communicating port, so that the fueling through the fueling nozzle can be stopped reliably. Hereinafter, a fuel level that the fuel flows through the main fuel inlet when the fuel tank is filled up is referred as the first level.

When the fuel is consumed and the fuel level inside the fuel tank decreases, the fuel inside the lower chamber flows out from the bottom through the bottom orifice or the one-way valve, so that the floating member is released from blocking the communicating port. In case that the bottom orifice is disposed in the bottom of the lower chamber, the fuel flows in the lower chamber before the level reaches the first level because the fuel enters the lower chamber through the bottom orifice. However, since the fuel flows into the lower chamber through the bottom orifice very slowly, the internal pressure of the fuel tank increases when the fuel reaches the first level. In other words, the bottom orifice functions like the one-way valve.

According to the second aspect of the present invention, in the fuel valve of the first aspect of the invention, the communicating port is composed of the first communicating port and the second communicating port having a size smaller than that of the first communicating port. Also, the lower chamber is divided into the first chamber communicating with the upper chamber through the first communicating port and the second chamber communicating with the upper chamber through the second communicating port. The main fuel inlet is divided into the first inlet formed in a side surface of the first chamber, and the second inlet formed in a side surface of the second chamber. A lower edge of the second inlet is located above a lower edge of the first inlet. Further, the floating member is divided into the first float stored in the first chamber for blocking the first communicating port from the first chamber side, and the second float stored in the second chamber for blocking the second communicating port from the second chamber side.

With the above-mentioned configuration, when the fuel level inside the fuel tank reaches the first inlet, i.e. the first level, upon fueling, the fuel enters the first chamber. However, at this stage, the fuel does not enter the second chamber from the second inlet, so that only the first float rises to block the first communicating port. Accordingly, the fuel tank communicates with the ventilation passage only through the second communicating port of the second chamber, thereby increasing the internal pressure of the fuel tank. Thus, the fuel level inside the fuel tube rises, so that the sensor at the fuel nozzle can detect the fill-up.

Once the fueling through the fuel nozzle is stopped due to the detection, the internal pressure of the fuel tank decreases by ventilation through the second communicating port of the second chamber. As a result, the fuel level inside the fuel tube decreases, so that the sensor at the fuel nozzle terminates the detection of the fill-up.

When the fuel is added and the fuel level inside the fuel tank reaches the second inlet referred as the second level, which is a level higher than the first level and a limit for the additional fueling, the fuel enters the second chamber. Accordingly, the second float rises to block the second communicating port. Thus, the fuel tank no longer communicates with the ventilation passage, thereby increasing the internal pressure of the fuel tank. The fuel level inside the fuel tube rises again, so that the sensor at the fuel nozzle can detect the fill-up again.

According to the third aspect of the invention, in the fuel valve of the first aspect of the invention, the communicating port is composed of the first communicating port and the second communicating port having a size smaller than that of the first communicating port. The main fuel inlet is formed in the side surface of the lower chamber, and a side orifice is provided below a lower edge of the main fuel inlet. The floating member is divided into the first float stored in the lower chamber for blocking the first communicating port from the lower chamber side, and the second float stored in the lower chamber for blocking the second communicating port from the lower chamber side. The second float is arranged to rise to block the second communicating port when the fuel level inside the fuel tank reaches the side orifice by the additional fueling after the first float blocks the first communicating port.

With the above-mentioned configuration, when the fuel level inside the fuel tank reaches the inlet, i.e. the first level, by fueling, the fuel enters the lower chamber. However, at this stage, the second float does not rise and only the first float rises to block the first communicating port. As a result, the fuel tank communicates with the ventilation passage only through the second communicating port, thereby increasing the internal pressure of the fuel tank. Thus, the fuel level inside the fuel tube rises, so that the sensor at the fuel nozzle side can detect the fill-up.

When the fueling through the fuel nozzle is stopped because of the detection, the internal pressure of the fuel tank decreases by ventilation through the side orifice. Accordingly, the fuel level inside the fuel tube decreases, so that the sensor at the fuel nozzle terminates the detection for the fill-up.

When the fuel is added, and the fuel level inside the fuel tank reaches the side orifice, i.e. the second level, due to the additional fueling, the internal pressure of the fuel tank rises and the fuel level inside the lower chamber rises, so that the second float rises to block the second communicating port. Thus, the fuel tank no longer communicates with the ventilation passage.

According to the present embodiment, the internal pressure inside the fuel tank increases again when the fuel level inside the fuel tank reaches the side orifice, i.e. the second level. Therefore, the fuel level inside the fuel tube rises again, so that the sensor at the fuel nozzle can detect the fill-up.

According to the fourth aspect of the invention, in the fuel valve of the first aspect, the lower chamber is composed of a casing member with an opening lower end and a cup member with an opening upper end. A lower edge of the casing member is located at the same level as an upper edge of a sidewall of the cup member, or the lower edge of the casing member is located below the upper edge of the sidewall of the cup member. The main fuel inlet is located between the upper edge of the sidewall of the cup member and the lower edge of the casing member, and the side orifice is located above the main fuel inlet.

With the above-mentioned configuration, when the fuel level inside the fuel tank reaches the main fuel inlet, i.e. the first level, by fueling, the fuel enters the lower chamber. At this moment, the fuel blocks the main fuel inlet, and the lower chamber communicates with a space above the fuel level inside the fuel tank only through the side orifice. Consequently, the internal pressure of the fuel tank rises, and the fuel level inside the lower chamber increases to raise the floating member. Accordingly, the fuel level inside the fuel tube increases, so that the sensor at the fuel nozzle can detect the fill-up. The floating member eventually blocks the communicating port.

When the fueling through the fuel nozzle is stopped due to the detection, a gas inside the fuel tank gradually enters the lower chamber through the side orifice, so that the fuel level inside the lower chamber decreases gradually. The floating member lowers, and the communicating port is opened. The internal pressure of the fuel tank decreases by ventilation when the fuel level inside the lower chamber becomes below the side orifice. Accordingly, the fuel level inside the fuel tube lowers, so that the sensor at the fuel nozzle terminates the detection of the fill-up.

When the fuel is added and the fuel level inside the fuel tank reaches the side orifice, i.e. the second level, by the additional fueling, the internal pressure of the fuel tank increases. The fuel level inside the lower chamber rises again to raise the floating member to block the communicating port. As a result, the fuel tank no longer communicates with the ventilation passage.

In this configuration, when the fuel level inside the fuel tank reaches the side orifice, i.e. the second level, the internal pressure of the fuel tank rise again. Therefore, the fuel level inside the fuel tube rises again, so that the sensor at the fuel nozzle side can detect the fill-up.

DETAILED DESCRIPTION OF PREFERRED EMBODIMENTS

Figure 1:
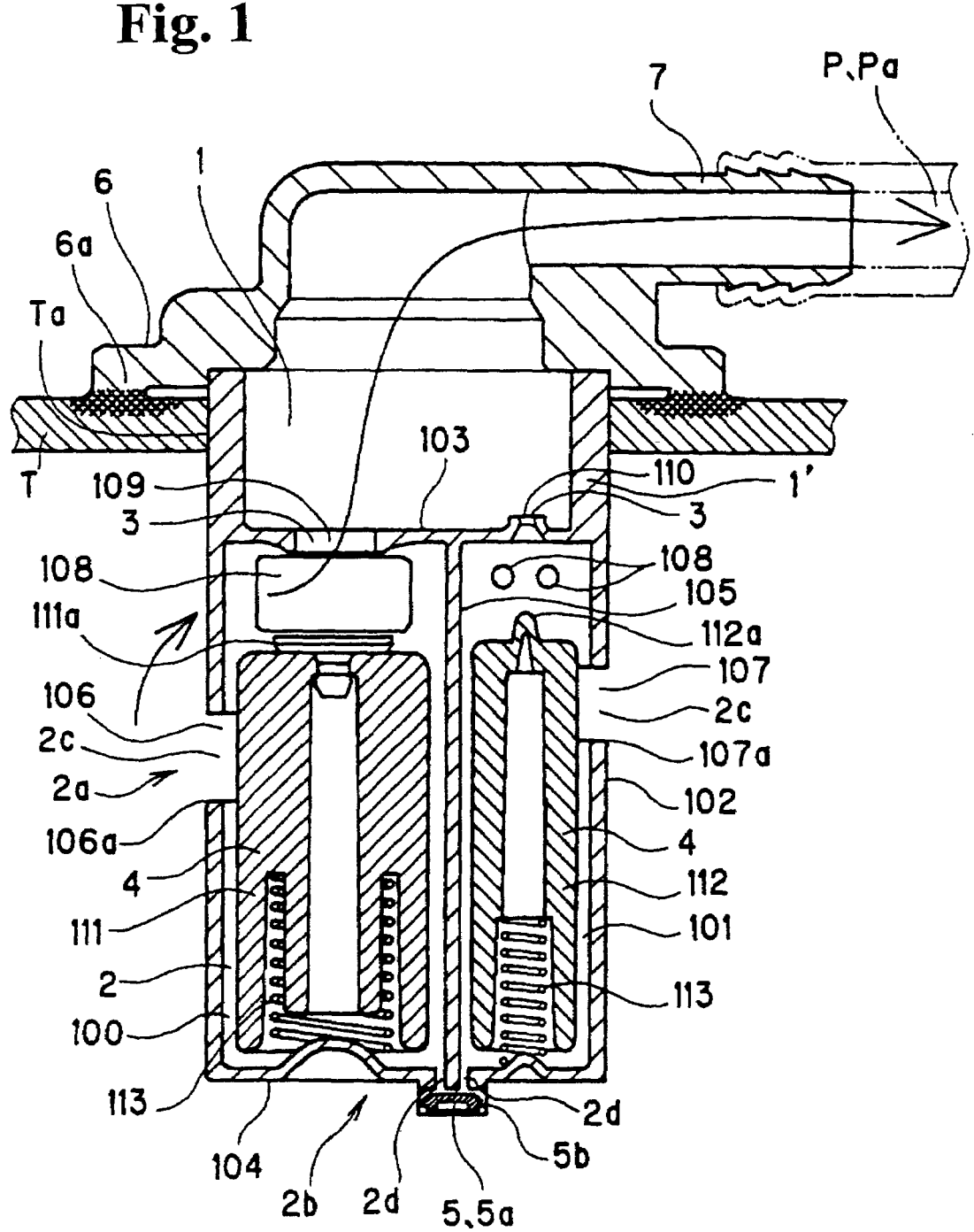
FIG. 1 is a sectional view of a valve according to the first embodiment.

Hereunder, embodiments of the present invention will be explained with reference to the accompanying drawings.

In a valve according to the present invention, when a fuel level inside a fuel tank T reaches a predetermined level (hereinafter referred as the first level L1) upon fueling, ventilation to a ventilation passage P of the canister is blocked or reduced, and an internal pressure of the fuel tank T is raised. Accordingly, a fuel level inside a fuel tube is raised by the increase in the internal pressure of the fuel tank T, so that a sensor at a fuel nozzle (also referred as a fuel gun) detects fill-up, thereby preventing over-fueling.

Also, in the valve of the present invention, when the sensor at the fueling nozzle detects the fill-up, the fueling nozzle automatically stops fueling. Then, when additional fuel, which is allowed due to a decrease in the internal pressure of the fuel tank T, is poured generally through operating the fueling nozzle manually, the fuel level inside the fuel tank T reaches another predetermined level higher than the first level L1 (hereafter, referred as the second level L2). In this state, the ventilation to the ventilation passage P of the canister is blocked again, and the internal pressure of the fuel tank T rises. Due to the increase in the internal pressure, the fuel level inside the fuel tube rises again, and the sensor at the fueling nozzle detects the fill-up again, thereby preventing over-fueling in the additional fueling.

The valve includes an upper chamber 1 communicating with the ventilation passage P to the canister; a lower chamber 2 disposed inside the fuel tank T; and communicating ports 3 for connecting the upper chamber 1 and the lower chamber 2. The valve is attached to the fuel tank T so that the whole part of the valve or the lower chamber 2 is inserted into the fuel tank T.

The valve also includes a flange 6 projecting outward at an upper side thereof. A portion of the valve below the flange 6 is inserted in the fuel tank T through a mounting hole Ta provided in the fuel tank T. Then, an outer peripheral part 6a of the flange 6 is welded to an outer surface of the fuel tank T to attach the valve to the fuel tank T. In other words, the valve is attached to the fuel tank T in a state that the lower chamber 2 is inserted into the fuel tank T.

Also, the valve includes float members 4 stored in the lower chamber 2. The float members 4 rise to block the communicating ports 3 from a side of the lower chamber 2 when the fuel flows into the lower chamber 2. In addition, the lower chamber 2 includes a one-way valve 5 disposed at a bottom 2b of the lower chamber for allowing the fuel to flow out only from the lower chamber 2, and a main fuel inlets 2c at a side 2a of the lower chamber.

The fuel flows into the lower chamber 2 once the fuel level inside the fuel tank T reaches the main fuel inlets 2c. Accordingly, the internal pressure of the fuel tank T rises, and the sensor at the fueling nozzle detects the fill-up.

With the configuration described above, in the valve of the present embodiment, the fuel is allowed to flow in the lower chamber 2 only when the fuel level inside the fuel tank reaches the main fuel inlets 2c formed in the side 2a of the lower chamber 2, thereby increasing the internal pressure of the fuel tank T. Therefore, it is possible to prevent such a case that when the fuel level inside the fuel tank T is swayed or waved by fueling, even if the fuel does not reach the first level L1, the fuel enters into the lower chamber 2 due to the sway. If this happens, as described above, the ventilation passage P of the canister is blocked or partially blocked, and the internal pressure of the fuel tank T rises, thereby increasing the fuel level inside the fuel tube and making the sensor at the fueling nozzle detect the fill-up.

Also, the main fuel inlet 2c is formed only in the side 2a of the lower chamber 2. Thus, it is possible to prevent the fuel from entering the upper chamber 1 through the communicating ports 3 before the floating members 4 block the communicating ports 3.

In addition, when the fuel reaches the first level L1, the floating members 4 eventually block the communicating ports 3, thereby completely stopping fueling through the fueling nozzle at this stage.

When the fuel is consumed and the fuel level inside the fuel tank T lowers, the fuel inside the lower chamber 2 flows out through the one-way valve 5 at the bottom 2b, thereby releasing the floating members 4 from blocking the communicating ports 3.

In the valve, the one-way valve 5 is composed of a valve plate member 5a with a size enough for covering the outlet 2d formed at the bottom 2b of the lower chamber 2, and a supporting frame member 5b for supporting a side of the valve plate member 5a to be vertically movable. The valve plate member 5a blocks the outlet 2d from the lower side when the valve plate member 5a is at an upper position. When the fuel level inside the fuel tank T rises up to a bottom surface of the valve plate member 5a, the valve plate member 5a is pushed up, and blocks the outlet 2d. Thus, the fuel does not enter the lower chamber 2 from the bottom 2b as the fuel reaches the first level L1. When the fuel level inside the fuel tank T lowers; the valve plate member 5a is pushed down by the fuel inside the lower chamber 2, thereby opening the outlet 2d. Accordingly, when the fuel level inside the fuel tank T lowers, it is possible that the fuel inside the lower chamber 2 flows out through the bottom 2b.

Also, the valve includes a sideways pipe 7 communicating with the upper chamber 1 at the top of the valve for attaching a tube Pa forming the ventilation passage P to the canister to allow the upper chamber 1 to communicate with the ventilation passage P.

Figure 2:
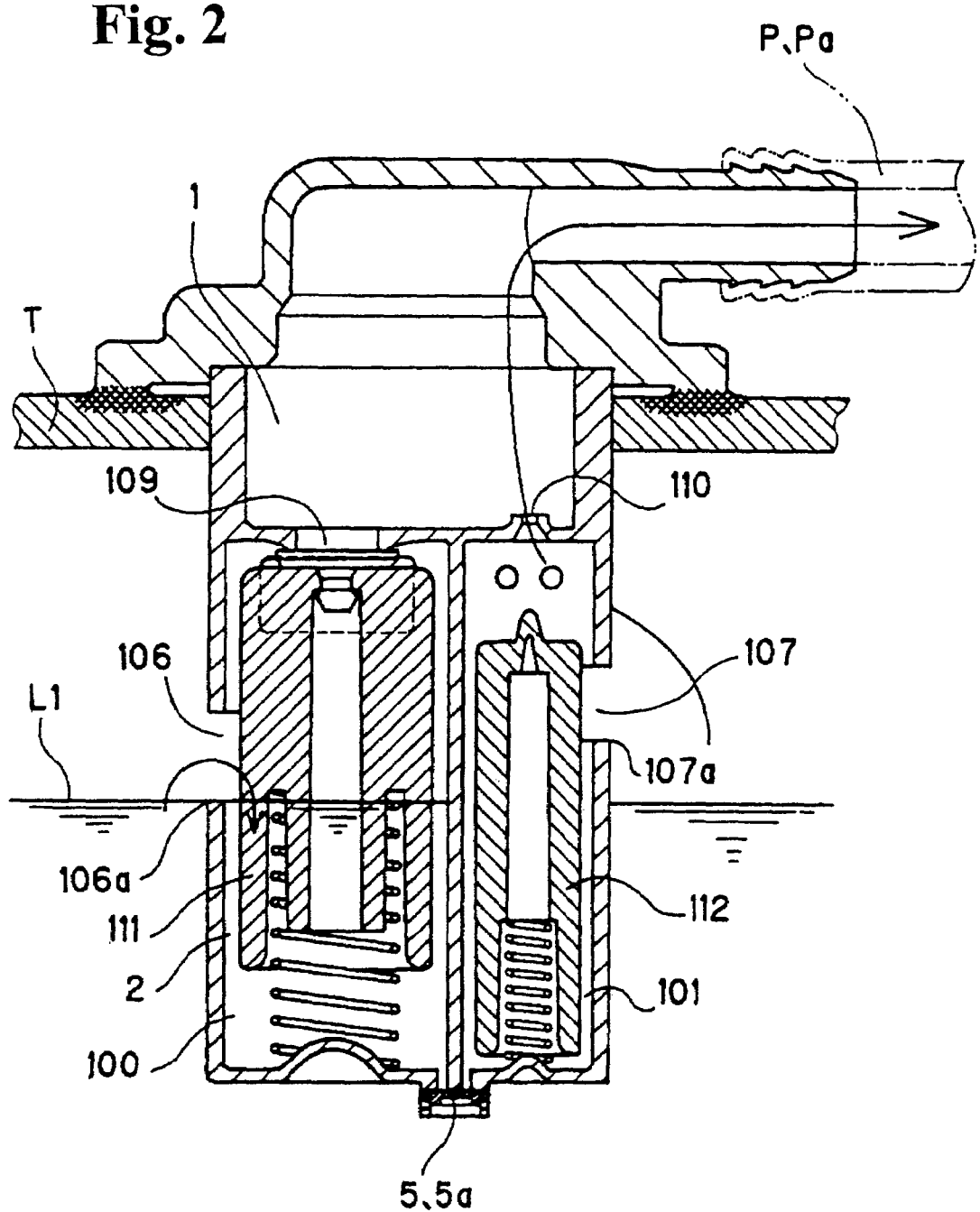
FIG. 2 is a sectional view of the valve according to the first embodiment.
Figure 3:
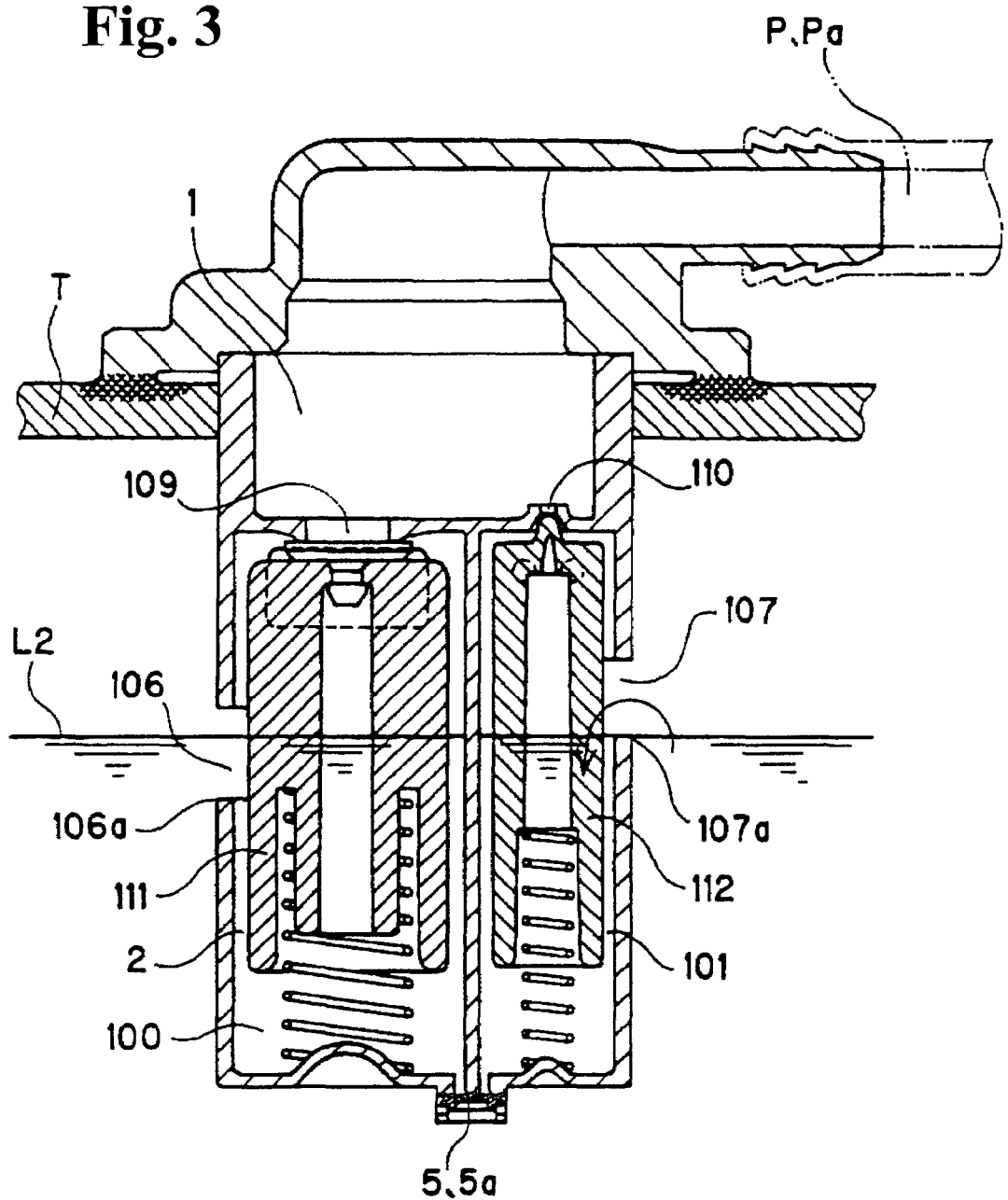
FIG. 3 is a sectional view of the valve according to the first embodiment.

FIGS. 1–3 are views showing the valve including the above-mentioned configurations. FIG. 1 shows a state that the fuel does not reach the valve, FIG. 2 shows a state that the fuel reaches the first level L1, and FIG. 3 shows a state that the fuel reaches the second level L2.

In the above-mentioned valve, the communicating ports 3 are composed of the first communicating port 109 and the second communicating port 110 having a diameter smaller than that of the first communicating port 109.

In the valve, the lower chamber 2 is divided into the first chamber 100 communicating with the upper chamber 1 through the first communicating port 109, and the second chamber 101 communicating with the upper chamber 1 through the second communicating port 110.

The lower chamber 2 is formed in a tubular member 102. A top of the tubular member 102 is integrated with an upper member 1' forming the upper chamber 1 with an upper divider plate 103 in between. The first communicating port 109 and the second communicating port 110 are formed in the upper divider plate 103 to pass therethrough.

A bottom of the tubular member 102 is closed with a bottom plate 104. The one-way valve 5 is provided in the bottom plate 104. Inside the lower chamber 2, a vertical divider plate 105 is formed between the upper divider plate 103 and the bottom plate 104 for separating the first chamber 100 from the second chamber 101 with liquid-tightness.

In the valve, the main fuel inlets 2c include the first inlet 106 formed in a side of the first chamber 100 and the second inlet 107 formed in a side of the second chamber 101. A lower edge 107a of the second inlet 107 is located at the side of the second chamber 101 above a lower edge 106a of the first inlet 106 at the side of the first chamber 100. Further, on a side of the tubular member 102, ventilation holes 108 are formed at both the first chamber 100 and the second chamber 101 at locations above the upper edge of the second inlet 107 and below the upper divider plate 103.

In the valve, the floating members 4 are composed of the first float 111 and the second float 112. The first float 111 is disposed in the first chamber 100 for blocking the first communicating port 109 when the fuel flows into the first chamber 100 to push the first float 111. The second float 112 is disposed in the second chamber 101 for blocking the second communicating port 110 when the fuel flows into the second chamber 101 to push the second float 112.

In the embodiment, the first communicating port 109 is formed in a size larger than that of the second communicating port 110. Accordingly, the first float 111 is larger than the second float 112.

The first float 111 and the second float 112 include a valve member 111a and a valve member 112a formed at upper ends thereof, respectively. Therefore, the first float 111 blocks the first communicating port 109 from the lower side when the first float 111 rises, and the second float 112 blocks the second communicating port 110 from the lower side when the second float 112 rises.

Also, compressed coil springs 113 are disposed in the lower chamber 2 between bottoms of the first float 111 and the second float 112 and the bottom plate 104 for urging the first float 111 and the second float 112 upward even when the first float 111 and the second float 112 are at lower positions.

In addition, the first float 111 is formed in a size for maintaining a constant space between an inner surface of the first chamber 100 and the first float 111. The second float 112 is formed in a size for maintaining a constant space between the inner surface of the second chamber 101 and the second float 112. Therefore, when the first float 111 and the second float 112 are at lower positions, a gas inside the fuel tank T enters the lower chamber 2 through the first inlet 106, the second inlet 107, and the ventilation holes 108, and flows into the upper chamber 1 through the first communicating port 109 and the second communicating port 110.

When the fuel in the fuel tank T reaches the first level L1 at the first inlet 106 upon fueling, the fuel enters the first chamber 100. However, at this stage, the fuel does not enter the second chamber 101 from the second inlet 107, and only the first float 111 rises to block the first communicating port 109 (FIG. 2). Accordingly, the fuel tank T communicates with the ventilation passage P only through the second communicating port 110 of the second chamber 101. Therefore, the internal pressure of the fuel tank T rises to increase the fuel level inside the fuel tube, so that the sensor at the fuel nozzle detects the fill-up.

Once the fueling through the fuel nozzle is stopped due to the detection, the internal pressure of the fuel tank T decreases by ventilation through the second communicating port 110 of the second chamber 101. Accordingly, the fuel level inside the fuel tube decreases as well, so that the sensor at the fuel nozzle terminates the detection of the fill-up.

When the fuel is added, the fuel inside the fuel tank T reaches the second level L2 at the second inlet 107, and the fuel enters the second chamber 101. As a result, the second float 112 rises, and the second communicating port 110 is blocked (FIG. 3). Thus, the fuel tank T no longer communicates with the ventilation passage P, and the internal pressure of the fuel tank T increases again. Therefore, the fuel level inside the fuel tube also rises, and the sensor at the fuel nozzle detects the fill-up again.

When the fuel level inside the fuel tank T lowers as consuming the fuel, the fuel inside the lower chamber 2 flows out through the one-way valve 5. The first float 111 and the second float 112 lower by their own weights, and both the first communicating port 109 and the second communicating port 110 are opened. At this state, the upper chamber 1 has a lower pressure than the lower chamber 2, or inside the fuel tank T. As a result, the valve members 111a and 112a of the floats 111 and 112 are pulled toward the communicating ports 109 and 110 when the fuel inside the lower chamber 2 flows out. However, because the second communicating port 110 is formed in a size smaller than that of the first communicating port 109, the valve member 112a of the second float 112 is pulled toward the second communicating port 110 with a force smaller than that of the valve member 111a of the first float 111 toward the first communicating port 109. Therefore, the second float 112 lowers first to decrease the internal pressure of the fuel tank T, thereby lowering the first float 111 without a long delay. In other words, in the present embodiment, the first communicating port 109 to be blocked by the first float 111 is formed in a large diameter so that the fuel can enter effectively, and the first float 111 can lower smoothly when the fuel level lowers.

In the present embodiment, it is possible to adjust the locations of the first level L1 and the second level L2 for the detection just by changing the positions of the first inlet 106 and the second inlet 107.

Figure 4:
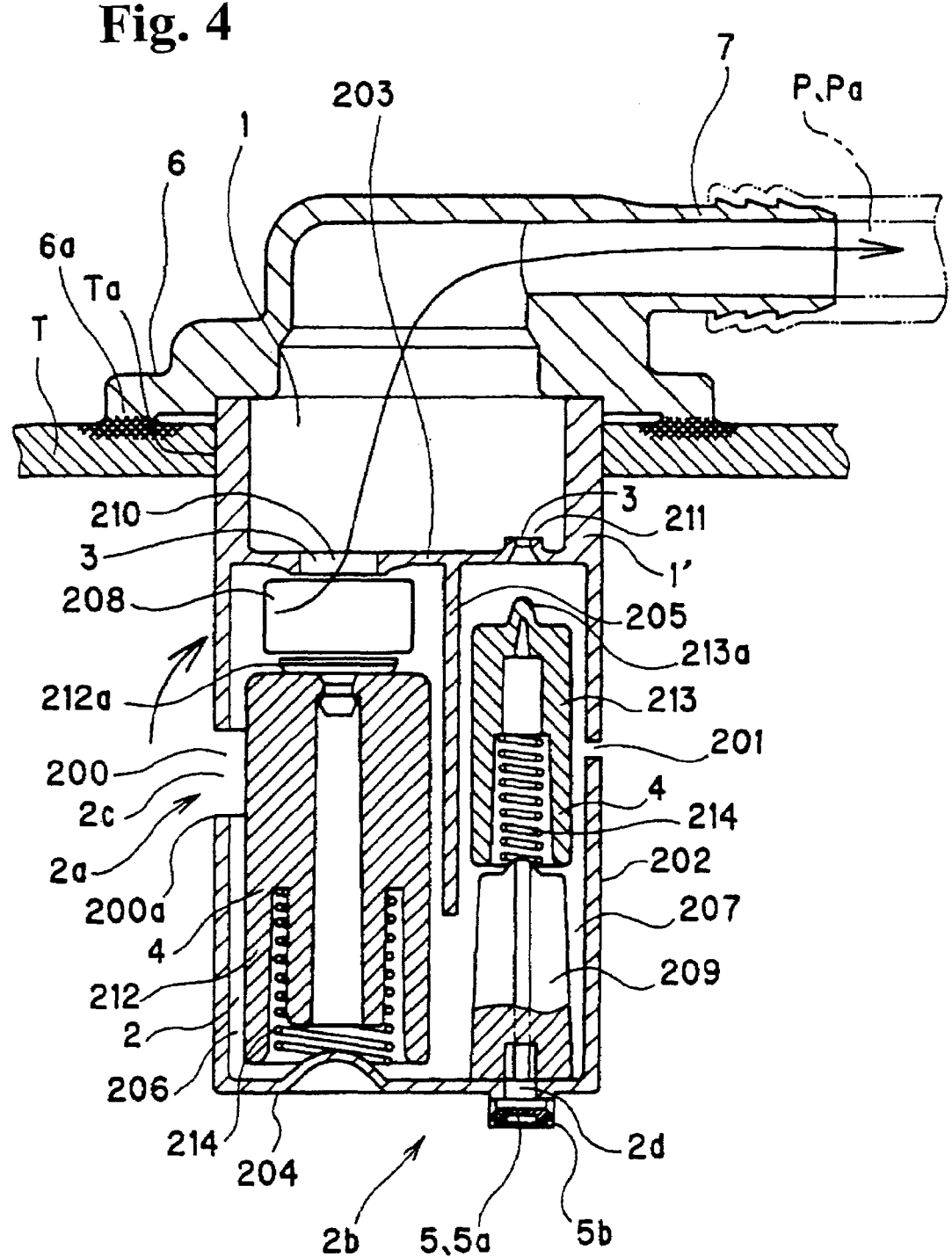
FIG. 4 is a sectional view of a valve according to the second embodiment.
Figure 5:
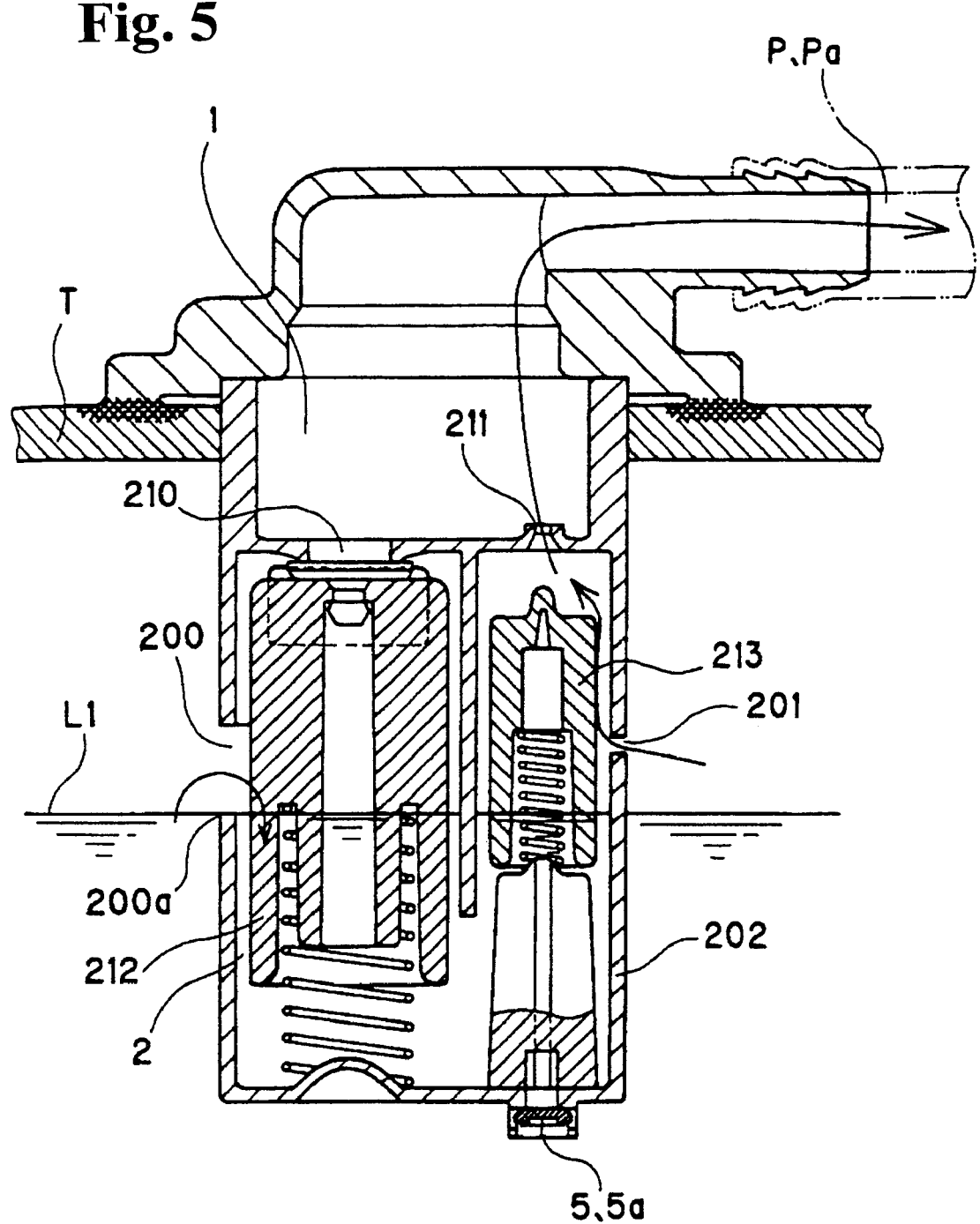
FIG. 5 is a sectional view of the valve according to the second embodiment.
Figure 6:
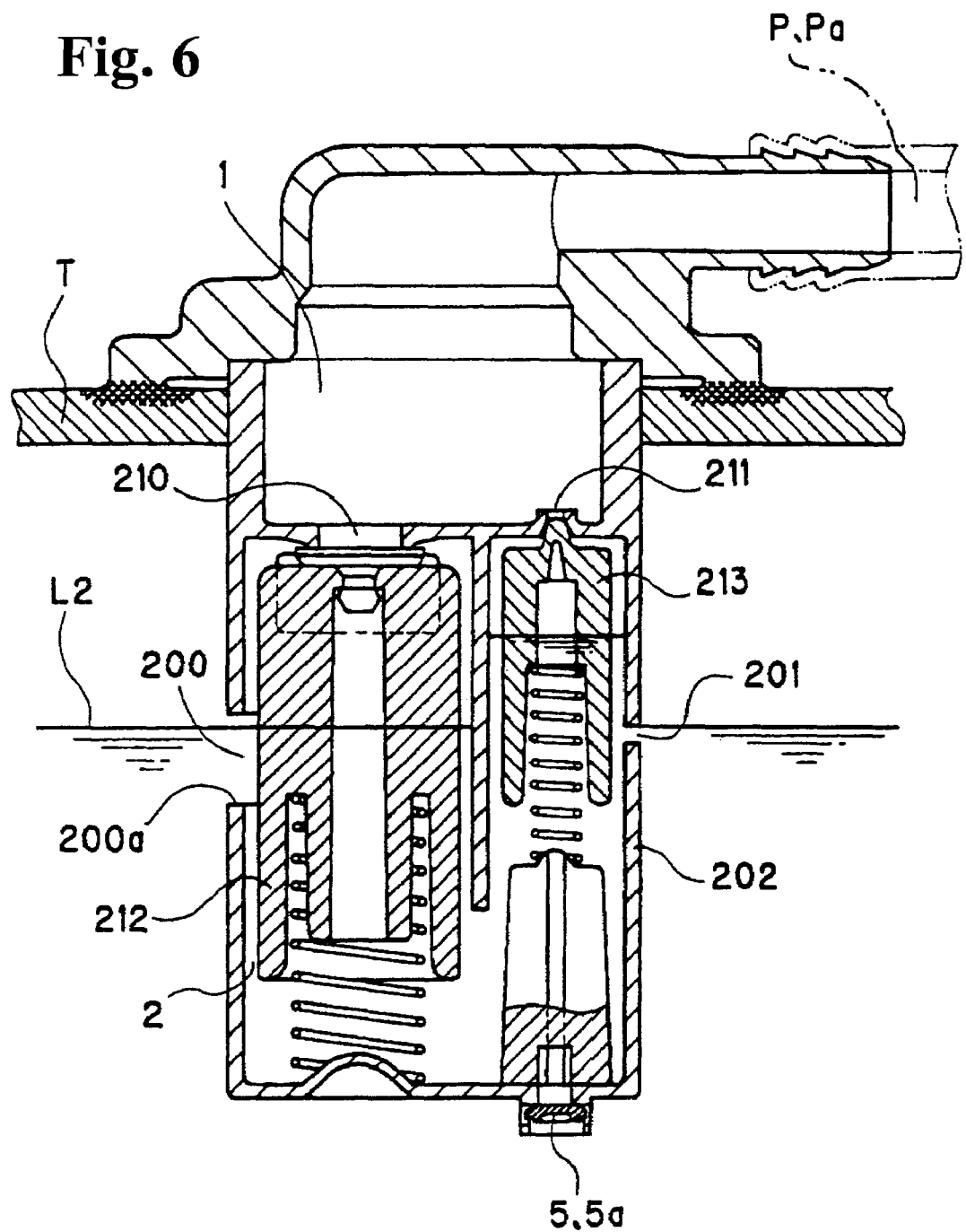
FIG. 6 is a sectional view of the valve according to the second embodiment.

FIGS. 4–6 show another embodiment of a valve including the components described above. FIG. 4 shows a state that the fuel does not reach the valve, FIG. 5 shows a state that the fuel reaches the first level L1, and FIG. 6 shows a state that the fuel reaches the second level L2.

According to this embodiment, the communicating ports 3 are composed of the first communicating port 210 and the second communicating port 211 having a size smaller than that of the first communicating port 210.

In the valve, the main fuel inlet 2c is composed of an inlet 200 formed in the side 2a of the lower chamber 2. A side orifice 201 is formed in the side 2a of the lower chamber 2 above a lower edge 200a of the inlet 200.

The lower chamber 2 is composed of a tubular member 202. An upper end of the tubular member 202 is integrated with an upper member 1' constituting the upper chamber 1 with an upper divider plate 203 in between. The first communicating port 210 and the second communicating port 211 are formed in the upper divider plate 203 for passing therethrough. A lower end of the tubular member 202 is closed with a bottom plate 204. The one-way valve 5 is provided in the bottom plate 204.

A vertical divider plate 205 extending downward is disposed in the lower chamber 2, and an upper end thereof is integrated with the upper divider plate 203. The vertical divider plate 205 divides the lower chamber 2 into the first chamber 206 for receiving the first float 212 and the second chamber 207 for receiving the second float 213. A space is provided between a lower end of the vertical divider plate 205 and the bottom plate 204, and the first chamber 206 and the second chamber 207 communicate with each other at a bottom 2b of the lower chamber 2.

In the embodiment, in addition to the inlet 200 formed in a side of the first chamber 206, a side orifice 201 is formed in a side of the second chamber 207. Also, a ventilation hole 208 is formed in the side of the first chamber 206 of the tubular member 202 at a location above an upper edge of the inlet 200 and below the upper divider plate 203.

In the valve, the float members 4 are composed of the first float 212 and the second float 213. The first float 212 is disposed in the lower chamber 2 for blocking the first communicating port 210 when the fuel flows into the lower chamber 2 to push the first float upward. The second float 213 is disposed in the lower chamber 2 for blocking the second communicating port 211 when the fuel flows into the lower chamber 2 to push the second float upward. The second float 213 is arranged to rise to block the second communicating port 211 when the fuel level inside the fuel tank T reaches the side orifice 201 by the additional fuel after the first communicating port 210 is blocked by the first float 212.

In the embodiment, since the first communicating port 210 is formed in a size larger than that of the second communicating port 211, the first float 212 is larger than the second float 213.

The first float 212 and the second float 213 include a valve member 212a and a valve member 213a formed at upper ends thereof, respectively. Therefore, the first float 212 blocks the first communicating port 210 from the lower side when the first float 212 rises, and the second float 213 blocks the second communicating port 211 from the lower side when the second float 213 rises.

A compressed coil spring 214 is disposed in the lower chamber 2 between a bottom of the first float 212 and the bottom plate 204 for urging the first float 212 upward even when the first float 212 is at a lower position. Also, another compressed coil spring 214 is disposed in the lower chamber 2 between a bottom of the second float 213 and an upper end of a supporting column 209 projecting upwards from the bottom plate 204 for urging the second float 213 upward even when the second float 213 is at a lower position.

In addition, the first float 212 is formed in a size for maintaining a constant space between an inner surface of the first chamber 206 and the first float 212. Similarly, the second float 213 is formed in a size for maintaining a constant space between the inner surface of the second chamber 207 and the second float 213. Therefore, when the first float 212 and the second float 213 are at the lower positions, a gas inside the fuel tank T enters the lower chamber 2 through the inlet 200, the side orifice 201, and the ventilation hole 208, and flows into the upper chamber 1 through the first communicating port 210 and the second communicating port 211.

When the fuel in the fuel tank T reaches the first level L1 at the inlet 200 upon fueling, the fuel enters the lower chamber 2. However, at this stage, the second float 213 does not rise, and only the first float 212 rises to block the first communicating port 210 (FIG. 5). Accordingly, the fuel tank T communicates with the ventilation passage P only through the second communicating port 211 of the second chamber 207. Therefore, the internal pressure of the fuel tank T rises to increase the fuel level inside the fuel tube, so that the sensor at the fuel nozzle detects the fill-up.

Once the fueling through the fuel nozzle is stopped due to the detection, the internal pressure of the fuel tank T decreases by ventilation through the side orifice 201 of the second chamber 207. Accordingly, the fuel level inside the fuel tube decreases as well, so that the sensor at the fuel nozzle terminates the detection of the fill-up.

When the fuel is added, the fuel inside the fuel tank T reaches the second level L2 at the side orifice 201, and the internal pressure of the fuel tank T increases. As a result, the fuel in the lower chamber 2 rises to raise the second float 112, and the second communicating port 211 is blocked (FIG. 6). Thus, the fuel tank T no longer communicates with the ventilation passage P.

That is, in the embodiment, from when the fuel in the fuel tank T reaches the second level L2 at the side orifice 201, the internal pressure of the fuel tank T increases again. Therefore, the fuel level inside the fuel tube also rises, and the sensor at the fuel nozzle detects the fill-up again.

When the fuel level inside the fuel tank T lowers as consuming the fuel, the fuel inside the lower chamber 2 flows out through the one-way valve 5. The first float 212 and the second float 213 lower by their own weights, and both the first communicating port 210 and the second communicating port 211 are opened. At this state, the upper chamber 1 has a lower pressure than the lower chamber 2, or inside the fuel tank T. As a result, the valve members 212a and 213a of the floats 212 and 213 are pulled toward the communicating ports 210 and 211 when the fuel inside the lower chamber 2 flows out. However, because the second communicating port 211 is formed in a size smaller than that the first communicating port 210, the valve member 213a of the second float 213 is pulled toward the second communicating port 211 with a force smaller than that of the valve member 212a of the first float 212 toward the first communicating port 210. Therefore, the second float 213 lowers first to decrease the internal pressure of the fuel tank T, thereby lowering the first float 212 without a long delay. In other words, in the present embodiment, the first communicating port 210 to be blocked by the first float 212 is formed in a large diameter so that the fuel can enter effectively, and the first float 212 can lower smoothly when the fuel level lowers.

In the present embodiment, it is possible to adjust the locations of the first level L1 and the second level L2 for the detection just by changing the positions of the inlet 200 and the side orifice 201.

Figure 7:
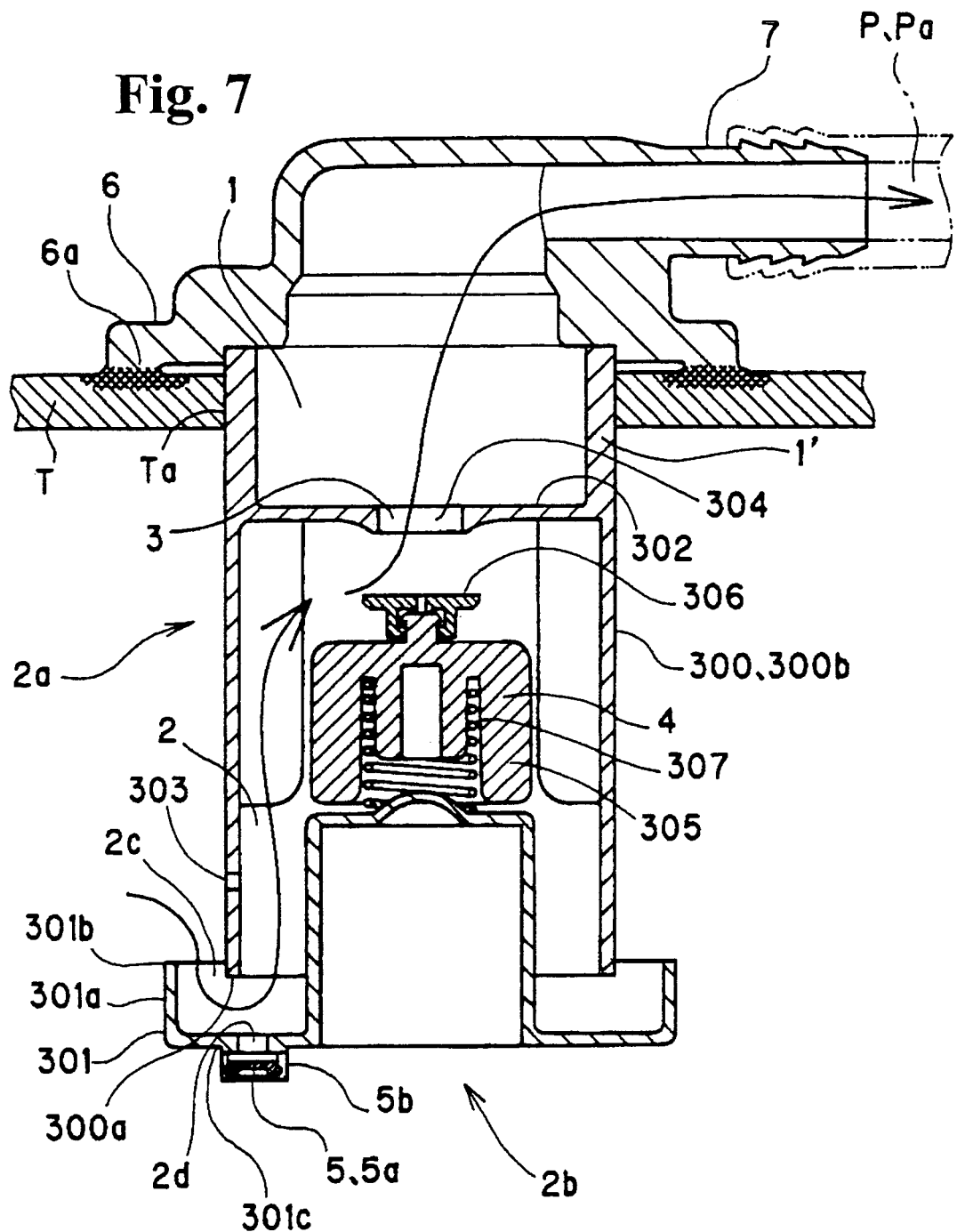
FIG. 7 is a sectional view of a valve according to the third embodiment.
Figure 8:
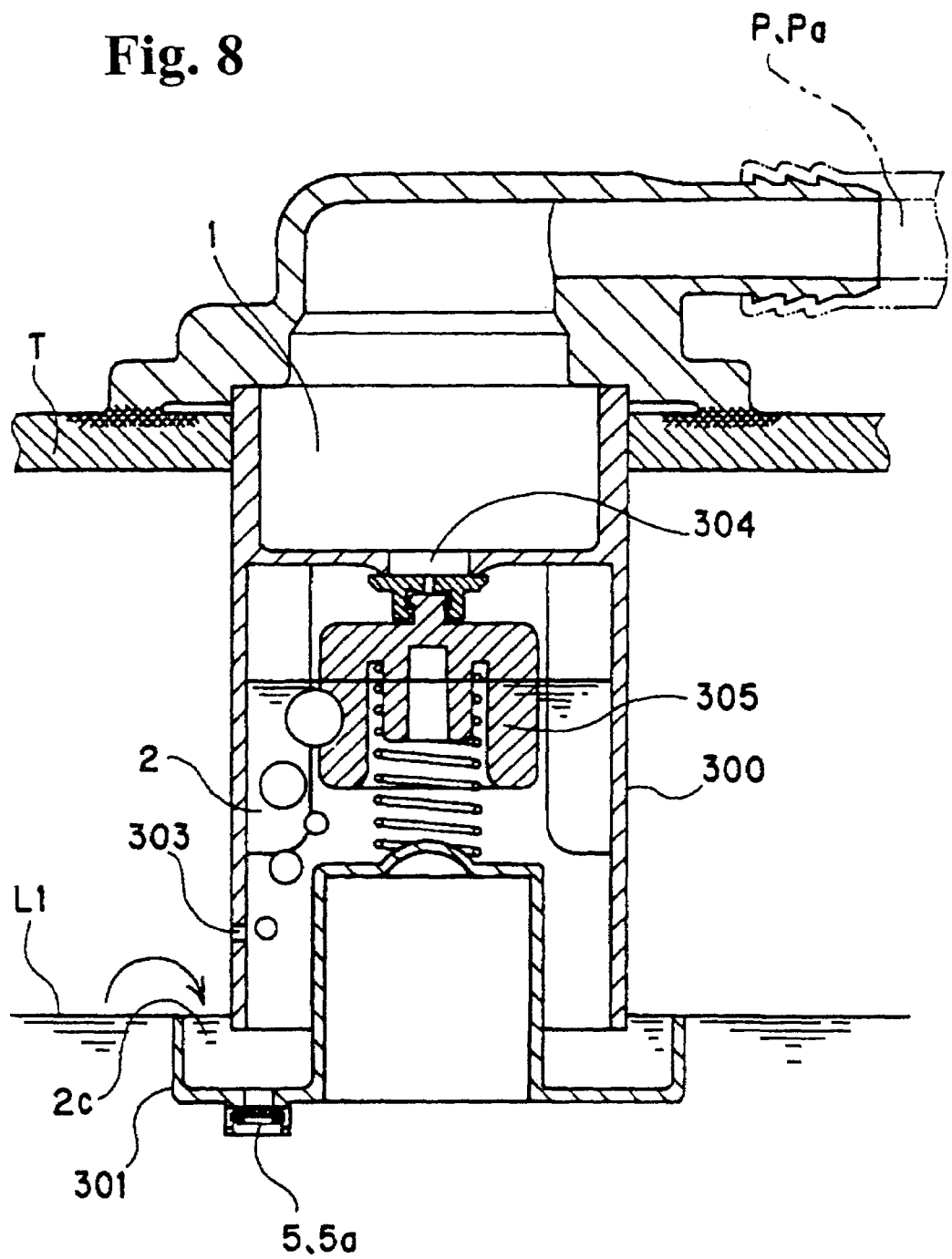
FIG. 8 is a sectional view of the valve according to the third embodiment, wherein circles in the figure represent a gas entering from a side orifice 303.
Figure 9:
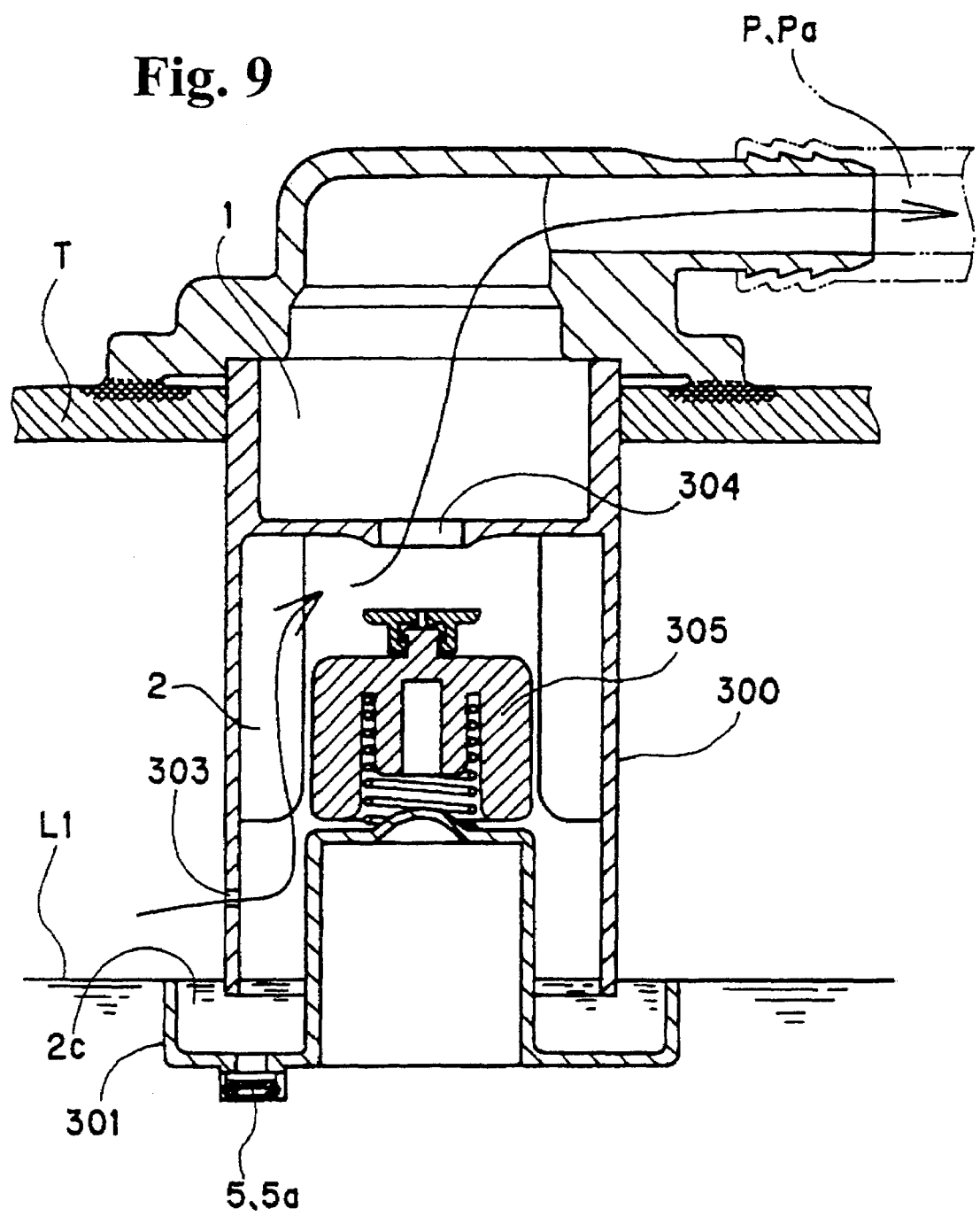
FIG. 9 is a sectional view of the valve according to the third embodiment.
Figure 10:
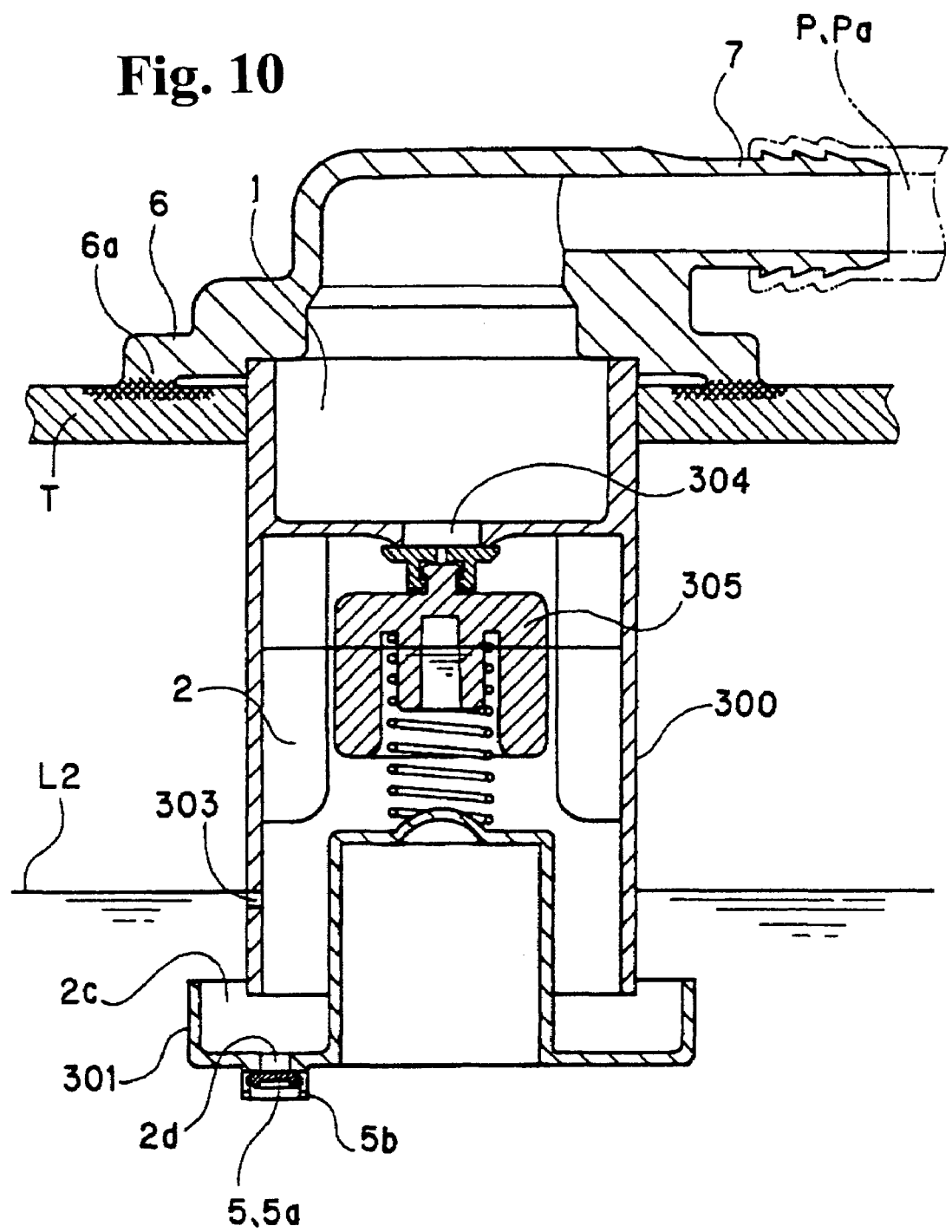
FIG. 10 is a sectional view of the valve according to the third embodiment.

FIGS. 7–10 show another embodiment of a valve including the above-mentioned components. FIG. 7 shows a state that the fuel does not reach the valve, FIG. 8 shows a state that the fuel reaches the first level L1, FIG. 9 shows a state just before the fuel is added, and FIG. 10 shows a state that the fuel reaches the second level L2.

In the valve of this embodiment, the lower chamber 2 is composed of a casing member 300 with a lower end opened, and a cup member 301 with an upper end opened. A lower edge 300a of the casing member 300 is located at a level same as an upper edge 301b of a sidewall 301a of the cup member 301. Alternatively, the lower edge 300a of the casing member 300 is located below the upper edge 301b of the sidewall 301a of the cup member 301.

In this embodiment, the lower edge 300a of the casing member 300 is located below the upper edge 301b of the sidewall 301a of the cup member 301.

More specifically, the casing member 300 is composed of a tubular member 300b with a lower end opened. An upper end of the tubular member 300b is integrated with the upper member 1' having the upper chamber 1 with an upper divider plate 302 in between. A communicating port 304 is formed in the upper divider plate 300 for passing through the same.

The cup member 301 includes a bottom plate 301c and the sidewall 301a projecting upwards from a peripheral edge of the bottom plate 301c. An inside diameter of the sidewall 301a of the cup member 301 is larger than an outer diameter of the casing member 300. The lower end of the casing member 300 is inserted in the cup member 301 so that the cup member 301 covers the lower end of the casing member 300 from the lower side.

A space is formed between the lower end of the casing member 300 and the bottom plate 301c of the cup member 301. Further, a space is formed between the sidewall 301a of the cup member 301 and a side of the casing member 300. Accordingly, the main fuel inlet 2c is formed between the upper edge 301b of the sidewall 301a of the cup member 301 and the lower edge 300a of the casing member 300. More specifically, in the present embodiment, the main fuel inlet 2c is opened upwards around the side 2a of the lower chamber 2.

In the present embodiment, the one-way valve 5 is provided in the bottom plate 301c of the cup member 301. Also, a side orifice 303 is provided above the main fuel inlet 2c.

In the present embodiment, the float member 4 is composed of a float 305 stored in the lower chamber 2 for blocking a communicating port 304 from the lower chamber 2 side when the fuel flows into the lower chamber 2 to push the float 304 upward. The float 305 is provided with a valve member 306 formed at an upper end thereof for blocking the communicating port 304 from the lower side when the float 305 rises.

A compression coil spring 307 is disposed between a bottom of the float 305 and an upper end of a projection projecting upwards at a center of the bottom plate 301c of the cup member 301 for urging the float 307 upward even when the float 307 is at a lower position.

In addition, the float 307 is formed in a size for maintaining a constant space between an inner surface of the lower chamber 2 and the float 307. Therefore, when the float 307 is at the lower position, a gas inside the fuel tank T enters the lower chamber 2 through the main inlet 2c and the side orifice 303, and flows into the upper chamber 1 through the communicating port 304.

When the fuel in the fuel tank T reaches the first level L1 at the main inlet 2 upon fueling, the fuel enters the lower chamber 2. Accordingly, the fuel blocks the main inlet 2, and the lower chamber 2 communicates with a space above the fuel level in the fuel tank T only through the communicating port 303. Therefore, an internal pressure of the fuel tank T increases to raise the fuel level in the lower chamber 2, thereby raising the fuel level inside the fuel tube, so that the sensor at the fuel nozzle detects the fill-up. At last, the float 304 blocks the communicating port 304 (FIG. 8).

Once the fueling through the fuel nozzle is stopped due to the detection, the gas in the fuel tank T gradually enters the lower chamber 2 through the side orifice 303. Accordingly, the fuel level inside the lower chamber 2 decreases to lower the float 304, thereby opening the communicating port 304. When the fuel level in the lower chamber becomes below the side orifice 303, the internal pressure of the fuel tank T decreases and the fuel level in the fuel tube lowers, so that the sensor at the fuel nozzle terminates the detection of the fill-up.

When the fuel is added, the fuel inside the fuel tank T reaches the second level L2 at the side orifice 303, and the internal pressure of the fuel tank T increases. As a result, the fuel in the lower chamber 2 rises to raise the float 305, and the communicating port 304 is blocked (FIG. 10). Thus, the fuel tank T no longer communicates with the ventilation passage P.

That is, in the embodiment, from when the fuel in the fuel tank T reaches the second level L2 at the side orifice 303, the internal pressure of the fuel tank T increases again. Therefore, the fuel level inside the fuel tube also rises, and the sensor at the fuel nozzle detects the fill-up again.

When the fuel level inside the fuel tank T lowers as consuming the fuel, the fuel inside the lower chamber 2 flows out through the one-way valve 5. The float 305 lowers by its own weight, and the communicating port 304 is opened.

In the present embodiment, it is possible to adjust the positions of the first level L1 and the second level L2 just by changing a size of the sidewall 301a of the cup member 301 and providing the side orifice 303 above the main inflow portion 2c changed according to the size of the sidewall 301a. With this configuration, the lower chamber 2 can be made compact.

Figure 11:
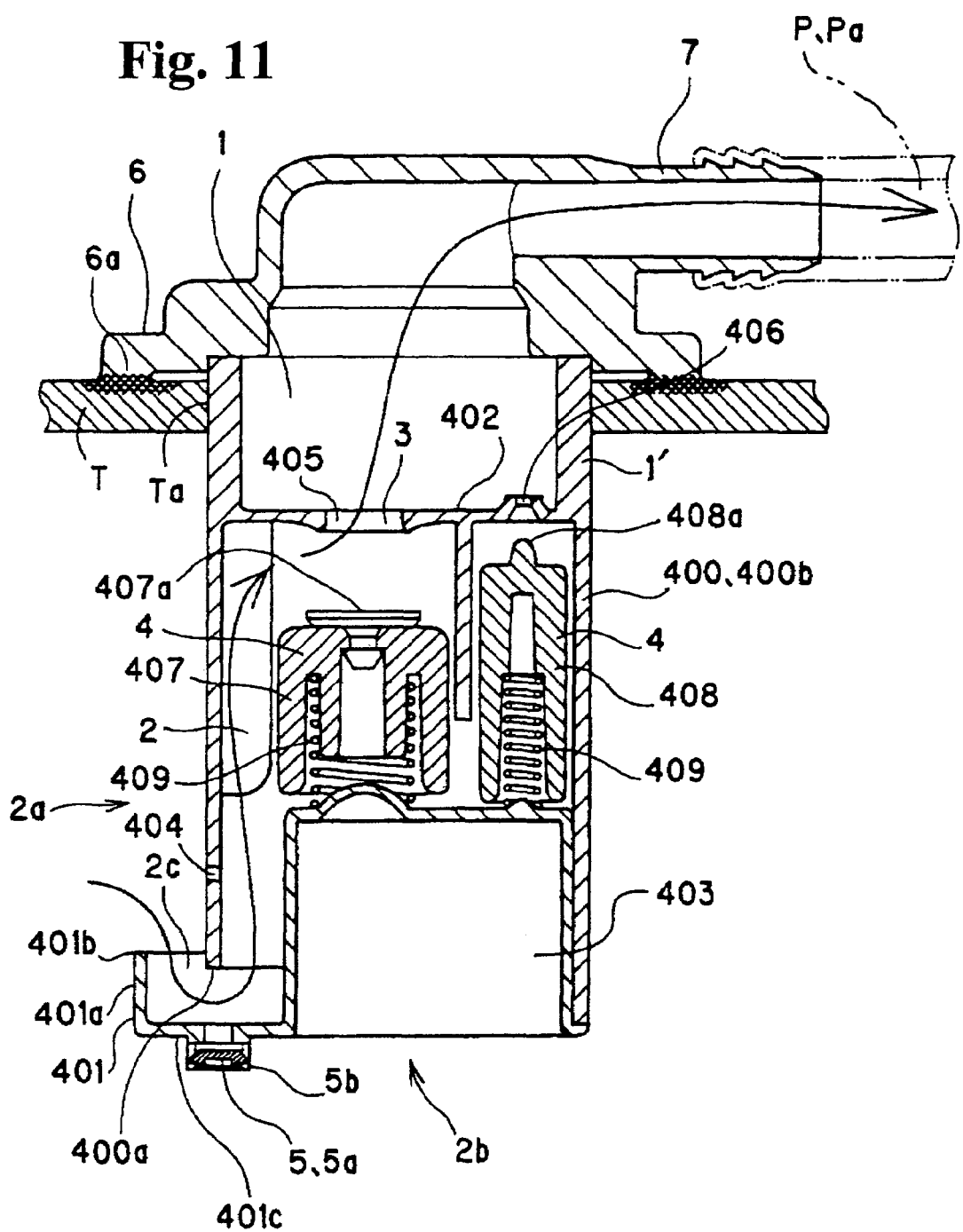
FIG. 11 is a sectional view of a valve according to the fourth embodiment.
Figure 12:
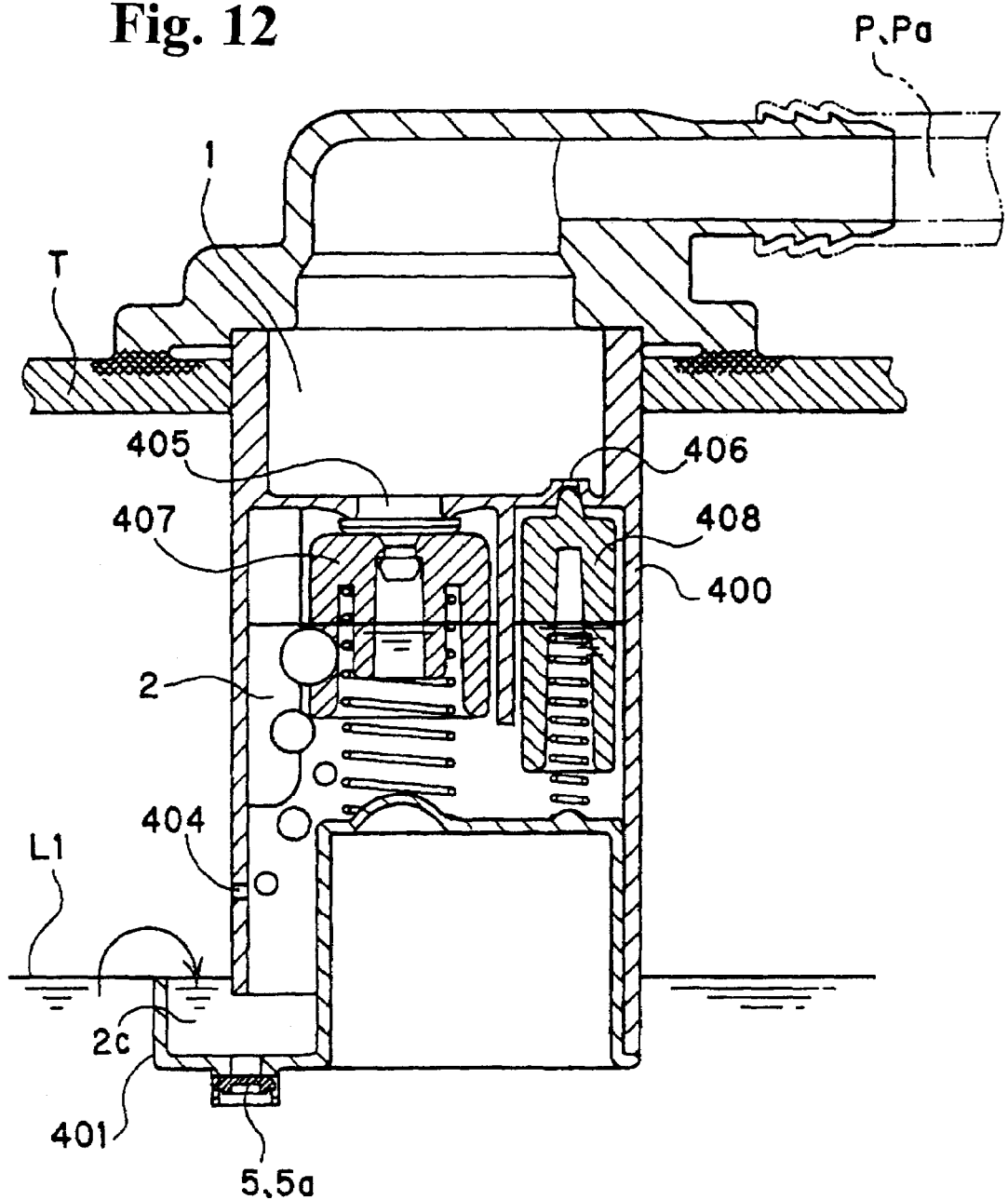
FIG. 12 is a sectional view of the valve according to the fourth embodiment, wherein circles in the figure represent a gas entering from a side orifice 404.
Figure 13:
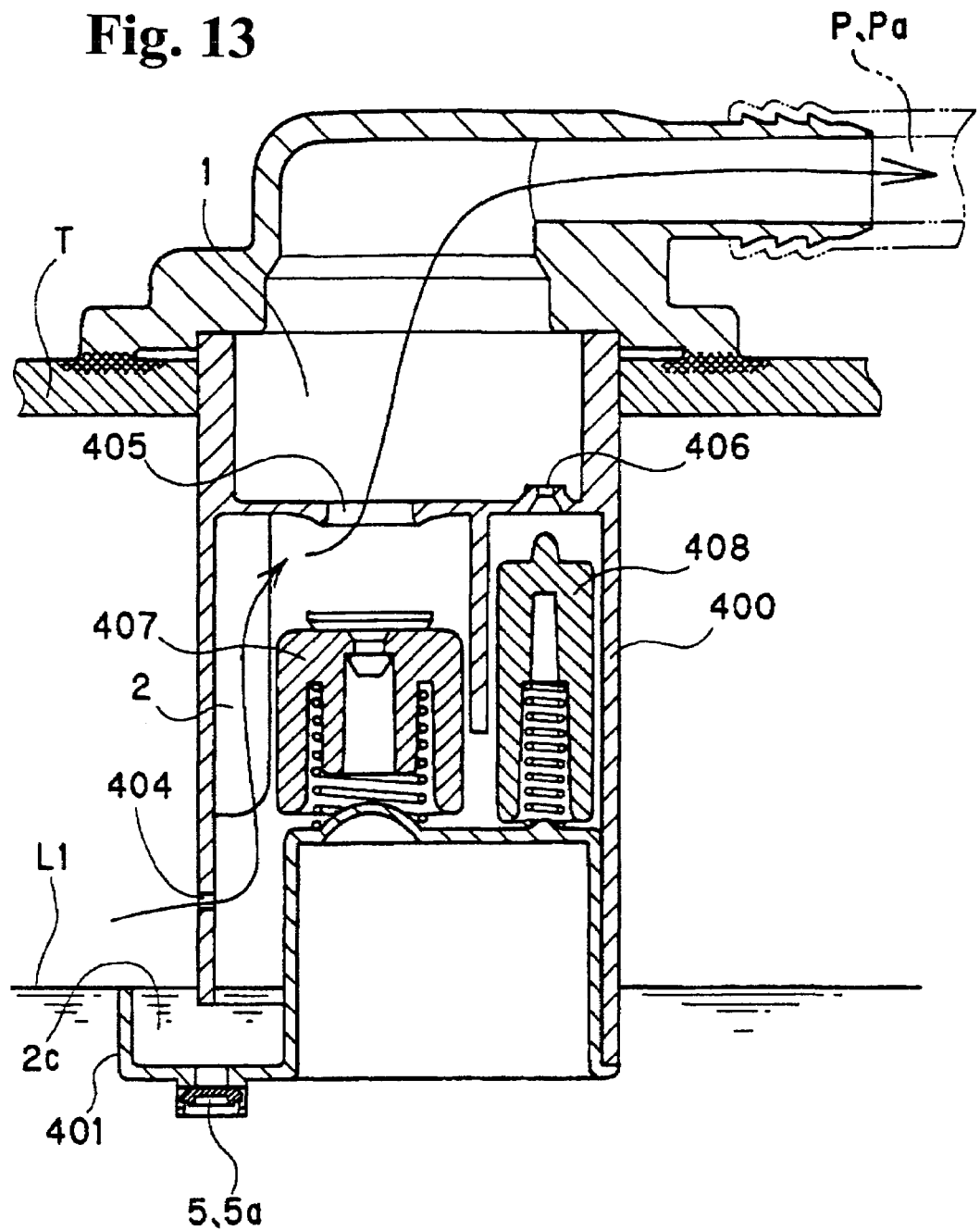
FIG. 13 is a sectional view of the valve according to the fourth embodiment.
Figure 14:
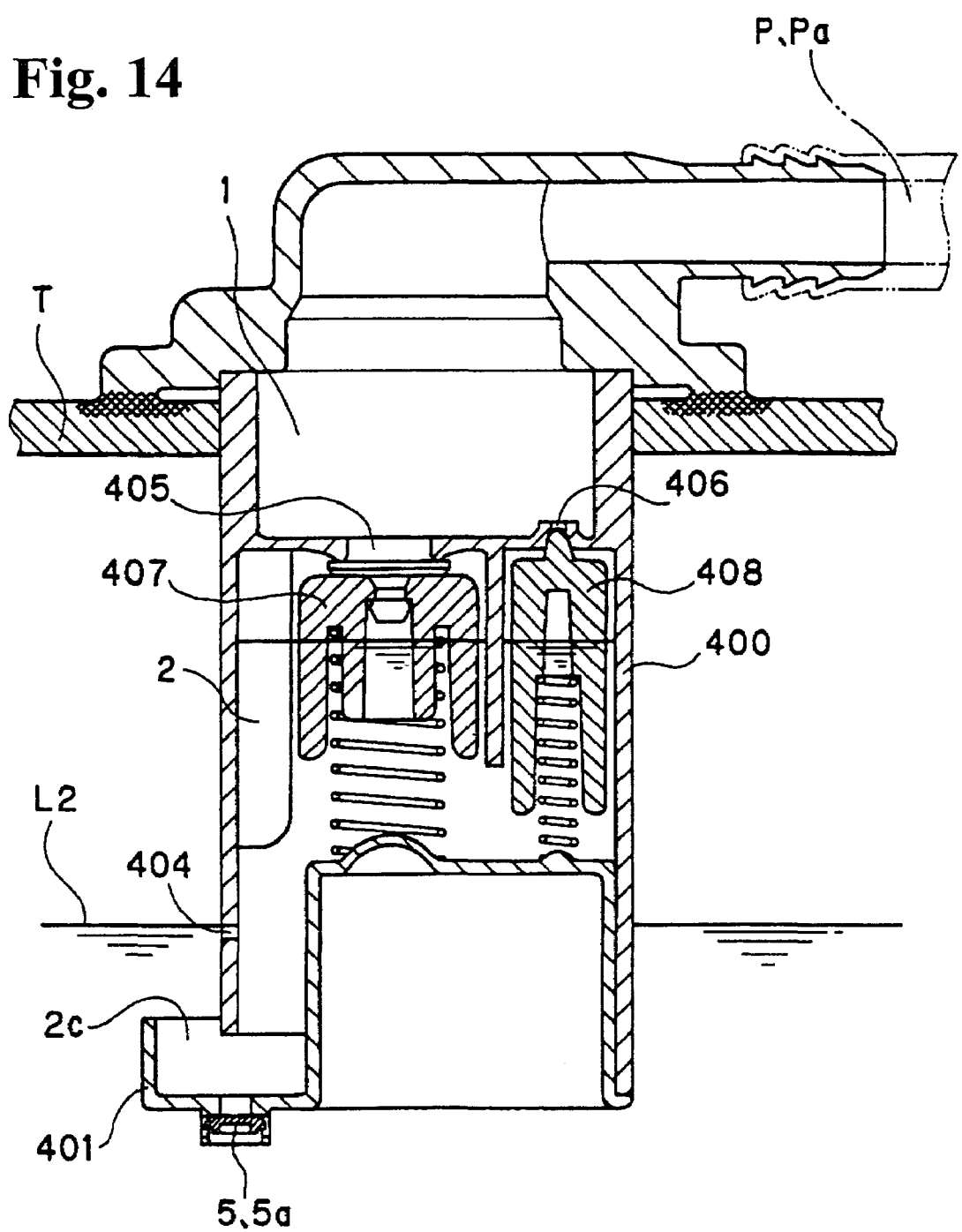
FIG. 14 is a sectional view of the valve according to the fourth embodiment.

FIGS. 11–14 show another embodiment of a valve including the above-mentioned components. FIG. 11 shows a state that the fuel does not reach the valve, FIG. 12 shows a state that the fuel reaches the first level L1, FIG. 13 shows a state just before the fuel is added, and FIG. 14 shows a state that the fuel reaches the second level L2.

In the valve of this embodiment, the lower chamber 2 is composed of a casing member 400 with a lower end opened, and a cup member 401 with an upper end opened. A lower edge 400a of the casing member 400 is located at a level same as an upper edge 401b of a sidewall 401a of the cup member 401. Alternatively, the lower edge 400a of the casing member 400 is located below the upper edge 401b of the sidewall 401a of the cup member 401. In this case, the lower edge 400a of the casing member 400 is located below the upper edge 401b of the sidewall 401a of the cup member 401.

More specifically, the casing member 400 is composed of a tubular member 400b with a lower end opened. An upper end of the tubular member 400b is integrated with the upper member 1' constituting the upper chamber 1 with an upper divider plate 402 in between.

In the valve, the communicating ports 3 are composed of the first communicating port 405 and the second communicating port 406 having a size smaller than that of the first communicating port 405. The first communicating port 405 and the second communicating port 406 are formed in the upper divider plate 402 for passing through the same.

The cup member 401 is formed on one side of a fitting portion 403 fitted to the casing member 400 from the opened lower end of the casing member 400. The cup member 401 includes a bottom plate 401c with one end integrated with the one side of the fitting portion 403, and a sidewall 401a projecting upward at an edge of the bottom plate 401c opposite to the side integrated with the fitting portion 403. In the embodiment, the sidewall 401a of the cup member 401 is located outside the casing member 400 in a state that the fitting portion 403 is fitted in the casing member 400.

A space is formed between the lower end of the casing member 400 and the bottom plate 401c of the cup member 401. Further, a space is formed between the sidewall 401a of the cup member 401 and the side 2a of the casing member 400. Accordingly, the main fuel inlet 2c is formed between the upper edge 401b of the sidewall 401a of the cup member 401 and the lower edge 400a of the casing member 400.

More specifically, in the present embodiment, the main fuel inlet 2c is opened upwards around the side 2a of the lower chamber 2.

There is a space between the fitting portion 403 and the inner surface of the casing member 400 at a side where the cup member 401 is formed. The fitting portion 403 is connected to the casing member 400 liquid-tight at other side.

In the present embodiment, the one-way valve 5 is provided in the bottom plate 401c of the cup member 401. Also, a side orifice 404 is provided above the main fuel inlet 2c.

In the valve of the present embodiment, the float member 4 is composed of the first float 407 stored in the lower chamber 2 for blocking the first communicating port 405 from the lower chamber 2 side when the fuel flows into the lower chamber 2 to push the first float 407 upward. The float member 4 also includes the second float 408 stored in the lower chamber 2 for blocking the second communicating port 406 from the lower chamber 2 side when the fuel flows into the lower chamber 2 to push the second float 408 upward.

In the embodiment, the first communicating port 405 has a size larger than that of the second communicating port 406, thus the first float 407 is larger than the second float 408.

Also, a vertical divider plate with an upper end integrated with the upper divider plate 402 divides the lower chamber 2. There is a space between a lower end of the vertical divider plate and an upper surface of the fitting portion 403. The first float 407 is stored in one of the divided spaces and the second float 408 is stored in the other of the divided spaces.

The first float 407 and the second float 408 are provided with valve members 407a and 408a formed at upper ends thereof for blocking the first communicating port 405 and the second communicating port 406 from below, respectively, when the first float 407 and the second float 408 rise.

Compressed coil springs 409 are disposed between the bottoms of the first and second floats 407, 408 and an upper surface of the fitting portion 403 for urging the first float 407 and the second float 408 upward, respectively, even when the first float 407 and the second float 408 are at lower positions.

In addition, the first float 407 and the second float 408 are formed in sizes for maintaining constant spaces between an inner surface of the lower chamber 2 and the first float 407 and the second float 408. Therefore, when the first float 407 and the second float 408 are at the lower positions, a gas inside the fuel tank T enters the lower chamber 2 through the main inlet 2c and the side orifice 404, and flows into the upper chamber 1 through the first communicating port 405 and the second communicating port 406.

When the fuel in the fuel tank T reaches the first level L1 at the main inlet 2 upon fueling, the fuel enters the lower chamber 2. Accordingly, the lower chamber 2 communicates with a space above the fuel level in the fuel tank T only through the side orifice 404. Therefore, the internal pressure of the fuel tank T increases to raise the fuel level in the lower chamber 2, thereby raising the first float 407 and the second float 408 as well as the fuel level inside the fuel tube, so that the sensor at the fuel nozzle detects the fill-up. At last, the first float 407 and the second float 408 block the first communicating port 405 and the second communicating port 406, respectively (FIG. 12).

Once the fueling through the fuel nozzle is stopped due to the detection, the gas in the fuel tank T gradually enters the lower chamber 2 through the side orifice 404. Accordingly, the fuel level inside the lower chamber 2 gradually decreases to lower the first float 407 and the second float 408, thereby opening the first communicating port 405 and the second communicating port 406. When the fuel level in the lower chamber 2 becomes below the side orifice 404, the internal pressure of the fuel tank T decreases and the fuel level in the fuel tube lowers, so that the sensor at the fuel nozzle terminates the detection of the fill-up.

When the fuel is added, the fuel inside the fuel tank T reaches the second level L2 at the side orifice 404, and the internal pressure of the fuel tank T increases. As a result, the fuel in the lower chamber 2 rises to raise the first float 407 and the second float 408, and the first communicating port 405 and the second communicating port 406 are blocked (FIG. 14). Thus, the fuel tank T no longer communicates with the ventilation passage P.

That is, in the embodiment, from when the fuel in the fuel tank T reaches the second level L2 at the side orifice 404, the internal pressure of the fuel tank T increases again. Therefore, the fuel level inside the fuel tube also rises, and the sensor at the fuel nozzle detects the fill-up again.

When the fuel level inside the fuel tank T lowers as consuming the fuel, the fuel inside the lower chamber 2 flows out through the one-way valve 5. The first float 407 and the second float 408 lower by their own weights, and the first communicating port 405 and the second communicating port 406 are opened.

Incidentally, the upper chamber 1 has a lower pressure than the lower chamber 2, or inside the fuel tank T. As a result, the valve members 407a and 408a of the floats 407 and 408 are pulled toward the communicating ports 405 and 406 when the fuel inside the lower chamber 2 flows out. However, because the second communicating port 406 is formed in a size smaller than that of the first communicating port 405, the valve member 408a of the second float 408 is pulled toward the second communicating port 406 with a force smaller than that of the valve member 407a of the first float 407 toward the first communicating port 405. Therefore, the second float 408 lowers first to decrease the internal pressure of the fuel tank T, thereby lowering the first float 407 without a long delay.

In the present embodiment, it is possible to adjust the positions of the first level L1 and the second level L2 just by changing a size of the sidewall 401a of the cup member 401 and providing the side orifice 404 above the main inflow portion 2c changed according to the size of the fitting portion 401. With this configuration, the lower chamber 2 can be made compact.

According to the fuel valve of the present invention for preventing the over-fueling, when an amount of the fuel reaches the fill-up level, the sensor at the fuel nozzle can accurately detect the fill-up. Also, it is possible to prevent the fuel from entering the ventilation passage of the canister.

The disclosure of Japanese Patent Application No. 2002-104279 filed on Apr. 5, 2002 is incorporated in the application.

While the invention has been explained with reference to the specific embodiments of the invention, the explanation is illustrative and the invention is limited only by the appended claims.

What is claimed is:

1. A fuel valve for connecting a fuel tank and a canister, comprising:
   an upper chamber communicating with the canister,
   a lower chamber connected to the upper chamber to be disposed inside the fuel tank and having a side wall and a bottom, a communicating port disposed between the upper chamber and the lower chamber for communication therebetween, said communicating port having a first communicating port, and a second communicating port having a size smaller than that of the first communicating port, a float member disposed in the lower chamber for blocking the communicating port when a fuel enters the lower chamber, one of a bottom orifice and a one-way valve formed in the bottom of the lower chamber for preventing the fuel to flow into the lower chamber therethrough and allowing the fuel to flow out from the bottom of the lower chamber therethrough, and a fuel inlet formed at a lower side of the side wall to face upwardly to allow the fuel to gradually enter the lower chamber so that an inner pressure in the fuel tank increases by entering the fuel into the lower chamber after the fuel reaches the fuel inlet, wherein said lower chamber is formed of a first chamber communicating with the upper chamber through the first communicating port and a second chamber communicating with the upper chamber through the second communicating port; and said float member includes a first float situated in the first chamber for blocking the first communicating port and a second float situated in the second chamber for blocking the second communicating port.

2. A fuel valve according to claim 1, wherein said fuel inlet includes another inlet formed in the side wall to communicate with the first and second chambers.

3. A fuel valve according to claim 2, wherein said lower chamber includes a dividing wall to separate the first and second chambers at an upper portion thereof and to communicate the first and second chambers at a lower portion thereof.

4. A fuel valve for connecting a fuel tank and a canister, comprising:

an upper chamber communicating with the canister, a lower chamber connected to the upper chamber to be disposed inside the fuel tank and having a side wall and a bottom, a communicating port disposed between the upper chamber and the lower chamber for communication therebetween, a float member disposed in the lower chamber for blocking the communicating port when a fuel enters the lower chamber, one of a bottom orifice and a one-way valve formed in the bottom of the lower chamber for preventing the fuel to flow into the lower chamber therethrough and allowing the fuel to flow out from the bottom of the lower chamber therethrough , and a fuel inlet formed at a lower side of the side wall to face upwardly to allow the fuel to gradually enter the lower chamber so that an inner pressure in the fuel tank increases by entering the fuel into the lower chamber after the fuel reaches the fuel inlet, wherein said lower chamber is formed of a casing member having an opening at a lower end, and a cup member having a side to face upwardly, said cup member being situated in the opening of the casing member so that the side of the cup member is located outside the lower end at a same level or above the lower end of the casing member to form the fuel inlet.

5. A fuel valve according to claim 4, further comprising a side orifice formed in the side wall of the lower chamber above the fuel inlet.

* * * * *